United States Patent [19]

Deal

[11] Patent Number: 4,608,179

[45] Date of Patent: Aug. 26, 1986

[54] CONTINUOUS PROCESS FOR THE DEWATERING OF PHOSPHATE SLIMES

[76] Inventor: Troy M. Deal, 277 Trismen Ter., Winter Park, Fla. 32789

[21] Appl. No.: 734,487

[22] Filed: May 16, 1985

Related U.S. Application Data

[63] Continuation of Ser. No. 543,346, Oct. 19, 1983, abandoned.

[51] Int. Cl.$^4$ .............................................. B01D 13/02
[52] U.S. Cl. .................................. 210/748; 210/800; 210/805; 210/907
[58] Field of Search .................... 210/170, 242.1, 710, 210/748, 790, 800, 804, 805, 907; 204/149

[56] References Cited

U.S. PATENT DOCUMENTS

| | | | |
|---|---|---|---|
| 3,761,239 | 9/1973 | Cook et al. ............................. | 71/33 |
| 3,788,079 | 1/1974 | Kirk et al. ......................... | 210/242.1 |
| 4,000,067 | 12/1976 | Smelley et al. ........................ | 210/42 |
| 4,094,338 | 6/1978 | Bauer ................................ | 210/242.1 |
| 4,107,026 | 8/1978 | Freeman ............................. | 204/300 |
| 4,115,233 | 9/1978 | Griffith ............................. | 204/180 |
| 4,194,960 | 3/1980 | Bleikamp, Jr. ...................... | 204/280 |
| 4,217,212 | 8/1980 | Deal ..................................... | 210/19 |
| 4,330,685 | 5/1982 | Bleikamp, Jr. .................. | 174/101.5 |
| 4,367,132 | 1/1983 | Bell et al. .......................... | 210/748 |
| 4,405,458 | 9/1983 | McHugh, Jr. .................... | 210/242.1 |

OTHER PUBLICATIONS

"Florida P$_2$O$_5$ Tailing Disposal Looks Good; Three Sand Clay Mixing Systems", in Nov. 1977, issue of World Mining (pp. 62–63).

"Waste Clay Dewatering and Disposal", by Leslie G. Bromwell and Thomas P. Oxford (pp. 541–558).

"Phosphatic Clay Waste Bibliography", by Dr. Henry L. Barwood and Ms. Patricia W. Boody.

United States Department of Interior Bureau of Mines Report of Investigations 8498—"Dewatering of Industrial Clay Wastes", by Annie Smelley, Bernard Scheiner & Jalna Zatko.

United States Dept. of Interior Bureau of Mines Report of Investigations 8089—"Characterization Studies of Florida Phosphate Slimes", by W. Lamont, J. McLendon, L. Clements Jr. and I. Feld.

United States Department of the Interior Bureau of Mines Report of Investigations 7892—"Laboratory Experiments in Electrokinetic Densification of Mill Tailings", by R. Sprute and D. Kelsh.

Primary Examiner—Thomas Wyse
Attorney, Agent, or Firm—Beaman & Beaman

[57] ABSTRACT

Method and apparatus for dewatering mill tailings, slimes and slurries, wherein ultra fine particles materially reduce the rate of natural dewatering and hinder their disposal in the mining and processing of phosphate, coal, potash, uranium, talc and the like. The invention is preferably carried out in a closed loop system involving the use of electrokinetic densification and substantially continuous decanting of the supernatant.

11 Claims, 9 Drawing Figures

FIG_1.

FIG_2.

FIG_4.

CONTINUOUS PROCESS FOR THE DEWATERING OF PHOSPHATE SLIMES

This is a continuation of application Ser. No. 06/543,346 filed Oct. 19, 1983, now abandoned.

The invention relates to the dewatering of waste industrial clays and the like, permitting their use in landfills and other purposes. At the present time such waste is being indefinitely impounded in settling areas in a colloidal state rendering the impoundment acreage useless.

While the invention is specifically concerned with the mining and processing of phosphate rock, it is deemed to have equal application to dewatering of many industrial clays and other wastes encountered in the processing of coal potash, uranium, talc and the like.

BACKGROUND OF THE INVENTION

In recent years, the present practice of dewatering phosphate slimes in large settling ponds has been the subject of great concern, particularly in the State of Florida.

More than 50,000 acres of otherwise productive land has been more or less permanently converted to slime disposal areas with 6000 additional acres being presently converted to that purpose each year. This represents tremendous losses in land, water and minerals.

STATE OF THE ART

Numerous efforts and proposals have been forthcoming during the last decade to improve the rate of dewatering phosphate slimes, prompted by falling water tables, hazards of impoundment, land use plans and increasing costs of land and environmental compliance:

(a) The U.S. Bureau of Mines has been active in this field, see reports RI7892, 8089 and 8498.

(b) Dr. Henry L. Barwood et al of the Florida Phosphate Research Institute has recently published a draft entitled "Phosphate Clay Waste Bibliography".

(c) Leslie G. Bromwell et al of the Florida Phosphatic Clays Research Project has extensively researched the subject, see pages 541-558 of an article entitled "Waste Clay Dewatering and Disposal".

(d) An overview of the subject appears in the November 1977 issue of *World Mining*, pages 62-64.

(d) See U.S. Pat. Nos. 3,761,239; 4,000,067; 4,107,026; 4,155,233; 4,194,960 and 4,330,685.

Since the turn of the century, phosphate slimes, as a waste, have been handled in Florida and elsewhere in the same manner. This stems from the fact that the average phosphate processing plant is operated on a continuous basis, producing in the order of 30,000 gallons of combined primary and secondary waste slimes per minute.

The magnitude of the waste involved, having a solids content in the order of 3.5% as discharged from the plant has prevented any material departure from the original practices of indefinite impoundment in mining cuts and diked ponds.

NATURE OF THE INVENTION

It is an object of the invention to provide a method and apparatus that lends itself to: (a) materially reducing the size of the settling areas required by existing phosphate plants, (b) balancing the dewatering capacity with the production capacity of the processing plant so as to avoid annual increases in settling areas, (c) improving the rate of dewatering, preferably without the use of flocculi, thickeners, and chemicals that may have detrimental effects upon recovered water and (d) combining natural dewatering with electrokinetics in such a manner that the use of electrical energy including that generated by solar energy may be commercially feasible.

Electrokinetic densification of dredged materials has been heretofore proposed. See *Development of Alternatives for Dewatering Dredged Material* by Halibarton, pp. 615–631, *Solid Waste Materials* (supra) and U.S. Pat. No. 4,107,026.

In the illustrated embodiment of the invention, the principle of electrokinetics has been adapted to the dewatering of phosphate slime ponds and slimes as discharged from the processing plant to increase its solids content to the extent required to form a stable landfill either as dewatered or when mixed with sand tailings within this narrow range. The economics of the present invention are deemed to compare favorably with present and projected costs of existing practices in the light of environmental and land use regulations.

In the following description and claims, the expression "closed loop" will be used to describe the mining and processing of phosphate rock and the like, wherein the dewatering operation is substantially in balance with plant production of the waste to be dewatered to the end that the area dedicated to settling purposes is substantially fixed; the area and/or volume of the settling area being inversely proportional to the speed of dewatering. While the mining of the phosphate rock and the like produces a mining cut and the waste processed material is returned to a mining cut for landfill purposes, it is to be understood that as a processing plant may be simultaneously receiving material from several sources the processed waste material may not be returned to the same location from which it was obtained, and the expression "closed loop" is not to be so interpreted.

U.S. Pat. No. 4,217,212, issued to the present applicant, dealt with the historical problem of waste slimes ponds, rather than the solution, by providing means for removing slimes from existing impoundments. The present invention eliminates the need for indefinite impoundment and controls the densification in such a manner as to permit the condensed slimes to be pumped from the settling area with conventional equipment.

ILLUSTRATED FORMS OF INVENTION

In the attached drawings is disclosed a closed loop system for mining and processing phosphate rock. Two different forms of settling area are shown, as well as several different forms for applying electrokinetics to increase the rate of natural dewatering.

It should be understood that the disclosure of the present invention, of necessity, has been substantially based upon a small scale experimental reduction to practice, using fresh plant waste slimes furnished by one or more phosphate rock processing plants in commercial operation in the State of Florida. However, the solids content, the density of the dewatered slimes and the stable nature of the mixtures of dewatered slimes and sand tailings have all been established following commercial practice.

An evaluation of the scope and content of the prior art with respect to the novelty of claims herein presented relative to a commercial closed loop system, requires an examination of the suggestion appearing on pages 557 and 558 of the aforesaid article by Bromwell et al.

As noted on page 542 of the Bromwell et al article, typical settling ponds are presently 400-800 acres in size. Using electrokinetics in combination with natural dewatering as herein proposed, it appears economically feasible to reduce the pond size to the order of 25-50 acres, or less.

With top decanting immediately on release to remove ions for better consolidation contributing 10% or more improvement experienced in the dewatering rate, one of the objects of the present invention relates to departures made to assure the uniform decanting of clear reusable water throughout the entire settling area.

A further object of the invention relates to the advantage of using electrokinetics upon fresh plant slimes substantially of the same pH as discharged from the plant. It appears that the aging of plant slimes results in an increase in alkalinity detrimental to the dewatering using electrokinetics and/or top decanting in combination with natural dewatering.

A still further feature involves the conception of using buoyant means for supporting one or both electrodes between which the current flows in the application of electrokinetics in the dewatering of slimes. As disclosed, these means may take several forms, all of which tend to reduce evaporation and assist in the removal of the dewatered slimes by pumping by reducing coning effects. One advantage of horizontally spaced electrodes which approach each other as decanting continues resides in a reduction in voltage requirements, as the separation diminishes.

Tests conducted with respect to the claimed subject matter clearly indicate that improvements in the rate of dewatering by direct current involves a substantial expenditure for the electrical energy required. For this reason, the use of solar energy to provide the electrical energy shows promise particularly in the State of Florida.

Under existing practice, the major cost components are land, dam and dike construction and dike maintenance. To be economically feasible for the phosphate industry, any alternative method must not greatly exceed such costs. However, any proposal that results in the use of less land and reduces the cost of land reclamation has commercial promise.

Turning now to the several forms of the invention illustrated herein for the purpose of enabling those skilled in the art to place in full scale commercial practice the principles in method and apparatus of the invention:

Closed Loop System

Figure 1:
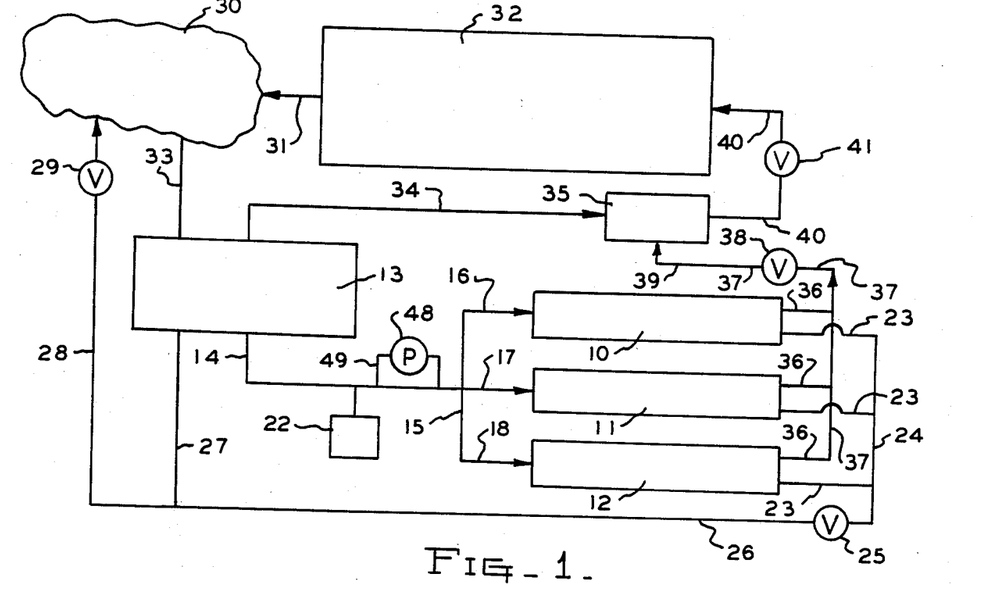
FIG. 1 is a schematic layout of a closed loop system using one form of settling area.
Figure 2:
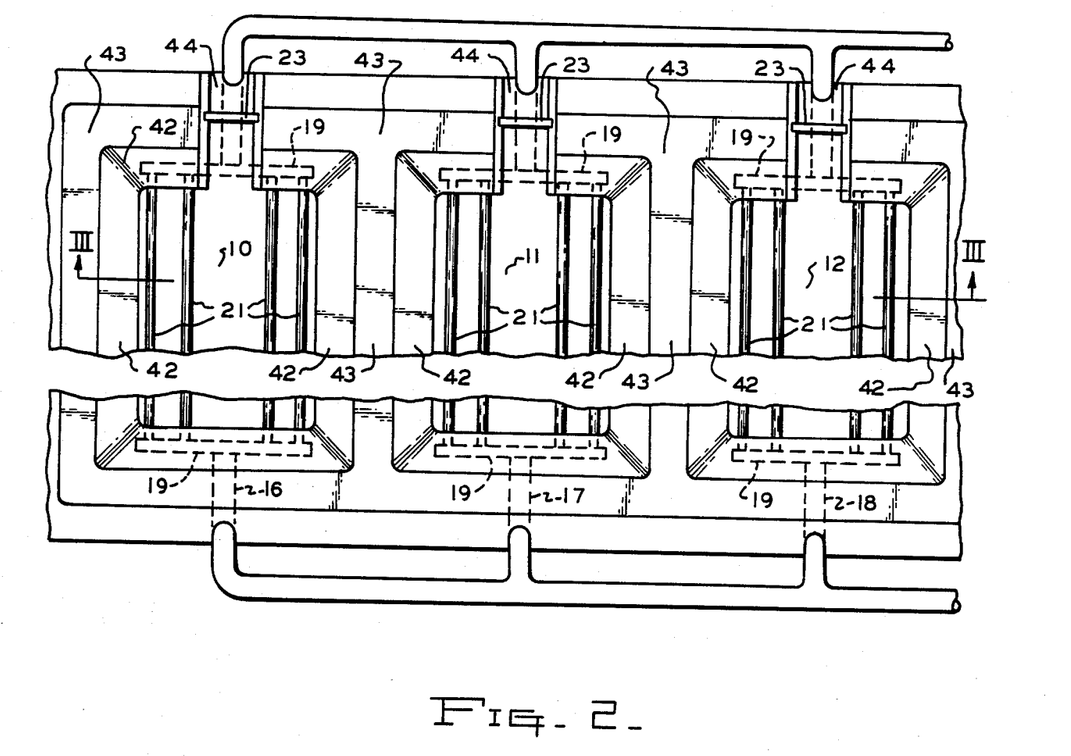
FIG. 2 is an enlarged plan view of the three part settling area shown in FIG. 1.
Figure 3:
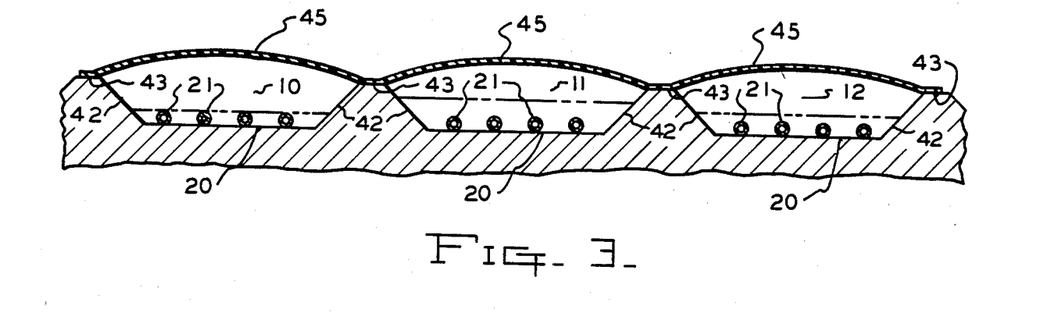
FIG. 3 is a vertical section taken on line III—III of FIG. 2, showing the use of inflated domes over the settling area.

Referring to FIGS. 1-3, a schematic layout of a closed loop system is shown in which three earthen settling areas or ponds 10, 11 and 12 are shown into which slimes are preferably flowing by gravity from the phosphate processing plant 13 through the pipe 14. In commercial practice the pipe 14 may be 48" in diameter and capable of carrying 30,000-40,000 gallons of slimes per minute. Pipe 14 is connected with a suitable manifold pipe 15 having remote control valving for selectively directing the slimes into pipes 16, 17 and 18, each having discharge into a suitable manifold pipe 19.

Each pond 10, 11 and 12 has a flat earthen bottom 20 upon which is disposed a network of perforated combination feed and drain pipes 21. Preferably, the pipes 21 are arranged in spaced parallel relation and sized to uniformly flood in sequence the entire bottom area of pond 10, 11 and 12. As a result, the level of the slimes in each pond is raised with substantially no turbulence to detrimentally affect the prompt formation of freed water rising to the surface of the plant slimes being discharged into the selected pond.

As the pipes 21 are preferably used to both feed the fresh slimes into the ponds, as well as to discharge the thickened slimes from the ponds, the sizing and perforating of the pipes 21 must be designed accordingly.

A presettling treatment station 22 for the slimes flowing in pipe 22 is shown in anticipation that reagents may be added to improve the dewatering rate in the ponds in the form of waste acids to control pH, flocculi, thickeners and the like.

To skim the supernatant from the surface of each pond at a rate preferably substantially conforming to the rate of dewatering, each pond 10, 11 and 12 is equipped with a suitable vertically adjustable weir 23 discharging into a suitable sump 24; the weirs 23 and sumps 24 being indicated by lines in FIG. 1.

A suitable pump 25 in pipe 26 connects with sump 24 on the intake side and with the pipes 27 and 28 on the discharge side; the pipe 27 returning the freed water to the plant 13 and the pipe 28 to the pressure pump 29 at the slurry pit 30. Dredged phosphate rock 31 from the mining cut 32 is transferred to the plant 13 through the line 33 in the form of a slurry.

Sand tailings from the plant 13 are transferred through line 34 to the mixing station 35, where the tailings are dewatered and mixed with the dewatered slimes being sequentially pumped from ponds 10, 11 and 12. To use the pipes 21 to remove the thickened slimes from the ponds, suitable manifolds properly valved and controlled, and indicated by lines 36 in FIG. 1, are connected in sequence with the suction line 37 of the pump 38, the discharge side of which is connected by the pipe 39 to the mixing station 35. A stable landfill mixture of tailings and thickened slimes is transferred by pipe 40 and pump 41 to the mining cut 32.

Settling Ponds

As shown in FIGS. 2 and 3, ponds 10, 11 and 12 are preferably designed by sloping earthen sides 42 forming flat top dikes 43, each channeled or tunneled at 44 to provide access to the vertically adjustable weirs 23. The slope of the sides 42 may be varied in practice to the point of becoming vertical and cast of concrete.

To secure the maximum benefits of the invention and reduce cost of construction and maintenance of the electrokinetic apparatus, the ponds may be provided with inflated roof structure 45 of the type in common use to enclose tennis courts, playing areas and the like. The perimeters of the structure 45 would be anchored to suitable footings embedded in the flat tops of the dikes 43. When solar energy is used to provide electrical energy for improvements in the dewatering rate, a roof structure capable of supporting suitable solar collectors will be used.

Based upon dewatering rates experimentally obtained in tests conducted and based upon the present invention, with plant discharge of primary and secondary waste slimes in the order of 30,000 gpm, each pond 10, 11 and 12 would approximate eight acres with a depth in the order of two feet. This would be the minimum sizing of the settling areas based upon maximum use of electrokinetics and minimum natural dewatering. However, it is anticipated that more surface area with less depth may be advantageous from the standpoint of voltage requirements resulting from shallow horizontal electrode separation.

Electrokinetics

Tests run using direct current of adjustable voltage to provide 1 to 2 amperes as the electrodes approached each other and substantially continuous decanting of freed water provided slimes of solids content capable of forming stable landfill with sand tailings within a dewatering time frame of the order of 17 to 26 hours. Best results were obtained with horizontal parallel electrodes, the upper electrode being floated and the lower electrode resting upon the insulated bottom of the test apparatus.

Figures 4, 7:
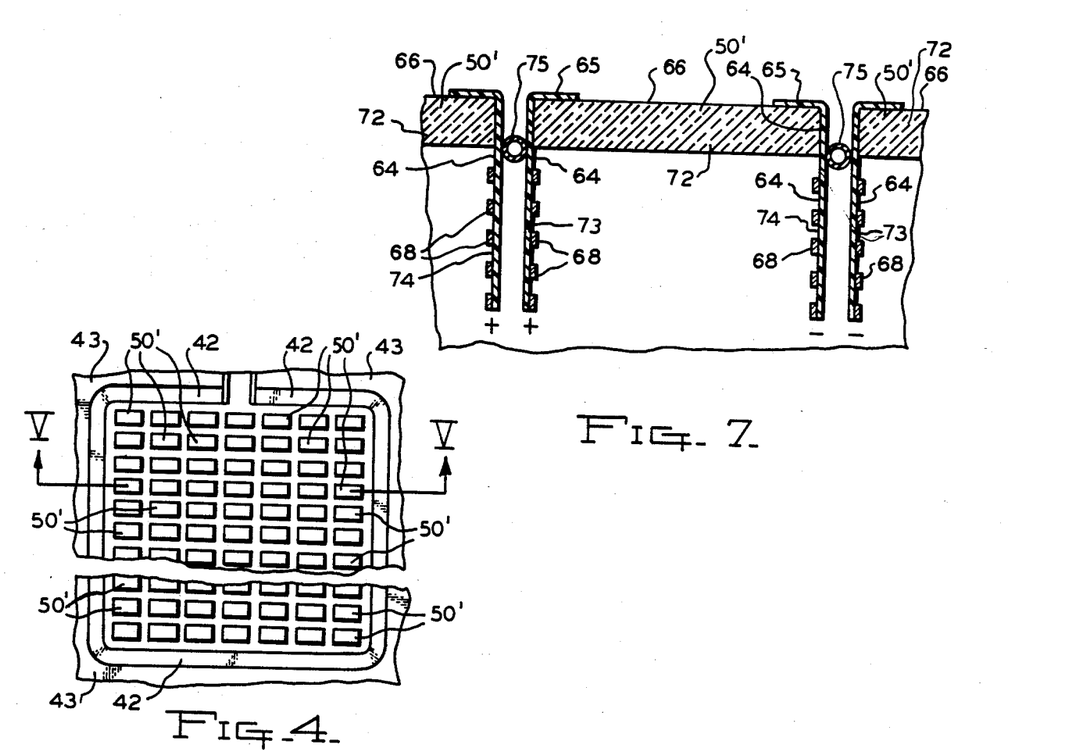
FIG. 4 is an enlarged plan view of one of the settling ponds shown in FIG. 2 with buoyant electrode supports in position on the pond surface.
FIG. 7 is a vertical section taken on line VII—VII of FIG. 6.

To equip the ponds with vertically spaced horizontal electrodes, after grading and compacting the earthen bottoms 20, suitable plastic film or sheeting 46, as shown in FIG. 4 is rolled out on the bottom in the form of 20' widths with overlapping longitudinal edges. Electrode structure 47, such as expanded metal, in commercial roll widths and gauges, is placed upon the sheeting 46 to hold it in place. Pipes 21 of plastic are then placed in horizontal spaced parallel arrangement over the entire area of the bottom 20.

By placing pipes under the lower electrodes, fluid ejected from these pipes will tend to reduce any accumulation of consolidated material thus reducing voltage requirements.

If the same pipes are to be used to both flood the ponds with plant slimes and to remove the thickened slimes following dewatering, the sizing of the perforations 21' in the pipes 21 will be controlled by the resistance offered by the dewatered slimes to conventional pumping. Preferably the perforations 21' will be located on the horizontal axis of the pipes and staggered on opposite sides along its length. If the ponds are sized and dewatered at a rate whereby each pond 10, 11 and 12 is refilled approximately ten times each month, the perforations 21' should be in the order of 1½"–2" in diameter.

Monitoring the Solids Content

By metering the plant slimes during filling of the ponds, as well as metering the freed water removed across the weirs 23, knowing the solids content at plant discharge will readily determine the termination of the dewatering cycle. Ignoring the evaporation that takes place during dewatering will result in the solids content of the dewatered slimes pumped to the mixture station 35 to be on the high side, thus assuring stable landfill.

Other forms of monitoring the solids content of the slimes being dewatered may be used, such as density meters, etc.

Aside from being electrically conductive, the design, material and gauge of the electrode 47, resting on the plastic sheetings 46, may take many forms. Both steel and aluminum commercially available ½" mesh expanded sheets have proven satisfactory.

Prior to attempting to pump the dewatered slimes from the settling area, it has been found advantageous to homogenize the slimes by mixing and/or stirring the entire dewatered body. This is for the reasons that the density increases from top to bottom during dewatering. It has the further advantage of removing an insulating accumulation of material from the electrodes as indicated above.

One practical means for establishing and stabilizing a relatively uniform density of slimes during pumping is to provide a network of perforated compressed air plastic pipes 121 adjacent the pipes 21. The perforations in the air pipes 121 should be very small and directed toward the pipes 21. To reduce required compressed air capacity to a minimum, the compressed air lines supplying the pipes 121 should be so valved and controlled that the pond may be sectionally "blown".

In addition to the use of compressed air prior to pumping the dewatered slimes to the mixing station 35, a high volume, high pressure booster pump 48 may be provided in a reservoired shunt 49 of the gravity slimes supply through pipe 14. Suitable valving and controls may then be used for a short period to sectionally flush the pipes 21 with high pressure, high volume plant slimes to prepare the dewatered slimes for pumping through the pipes 21 to the mixing station 35. At the same time the electrodes on the bottom may be vibrated.

It will be understood that the plant slimes used for flushing would be drawn from the reservoir of the shunt 49 to prevent "starving" the pump 45 during its short period of operation.

Buoyant Electrode Support

FIG. 4 is a fragmentary sectional view of a portion of pond 10 shown greatly out of proportion in order to show the relationship between the structure supported on the bottom and the buoyant support for the upper electrode structure.

Slab-like buoyant supports 50 are shown in FIG. 4 floating on the freedwater surface 51 of the slimes, the interface between the supernatant and the colloidal slime suspension being indicated at 53.

Supports 50 may take many forms and may be fabricated from standard commercial components. As shown, a 4'×8' sheet of ¼" exterior plywood provides a top 54 to which is bonded, on the underside, a 4'×8'×2" slab 55 of closed cell foam such as urethane. A 4'×8" sheet of expanded metal providing the electrode 56 is suitably removably attached to the underside of the slab 55. Electrode 56 may be of the same gauge and material as the bottom electrode 47. However, other shapes and materials may be used for the upper electrode such as lead.

To provide a potential between electrodes 47 and 56, the electrode 47, which extends entirely across the bottom 20, is provided with terminals 57. Suitable terminals 58 are in conductive relation to their lower ends with the electrode 56 and extend upwardly through the slab 55 and and top 54 to removably and conductively engage with clamp action an electrical conductor 59. Terminals 58 are located adjacent opposite ends of each buoyant support 50 on the centerline thereof.

The conductor 59 extends across the entire width of the pond 10, being removably anchored at opposite ends to the dike 43 through a suitable expansion coil 60 to accommodate the vertical movement of the buoyant supports 50 during filling, dewatering and pumping. Conductors 59 may perform the additional functions of an anchor and towline for the supports 50 in each row.

Attached to the terminals 57 of the electrode 46 are conductors 62 which, along with the conductor 59, are connected to sources of direct current located on opposite sides of the pond 10. The width of the material from which the electrode 46 is fabricated will preferably determine the spacing of the terminals 57.

It will be understood from FIG. 4 that substantially the entire surface of the ponds 10, 11 and 12 is covered with the buoyant supports 50 with each row of the supports 50 being connected with a separate conductor 59. By having little clearance between adjacent supports 50 in the same and adjacent rows, excessive relative movement between supports 50 on the surface of the pond is avoided. The foam slabs 55 will be substantially protected from abrasion by the plywood tops 54.

Application of Electrokinetics

Figure 5:
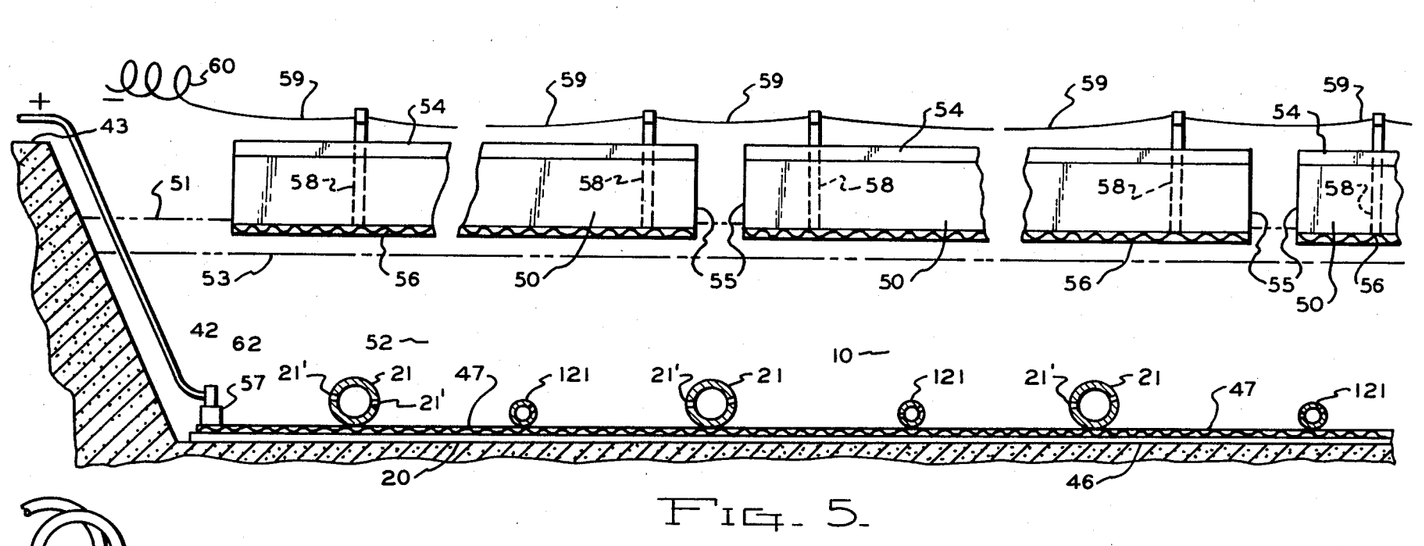
FIG. 5 is an enlarged fragmentary vertical section taken on line V—V of FIG. 4, showing the use of vertically spaced horizontal electrodes.

The arrangement of FIG. 5 is similar to that used in conducting tests during the development of the invention. Several options are available. Under one option, settling pond 10 may be first filled with plant slimes 52 to some selected level 51 before providing an electrical potential between the electrodes 47 and 56, the difference between levels 51 and 53 representing natural dewatering during filling.

Under a second option, with the pond empty, the buoyant supports 50 rest on the pipes 21 and are insulated thereby from the electrode 47. The "on fill" stage of pond 10 is started floating the supports 50 from their position of rest on the pipes 21. At this point a dewatering potential may then be established between the electrodes 47 and 56. An interface 53 will quickly form between the freed water level 51 and the colloidal suspension placing the electrode 56 in clear water.

When the dewatering of pond 10 is taking place under the second option, the supports 50 will be raised gently with the rate of rise being determined by the difference between the volume of plant slimes being discharged into the pond 10 and the volume of freed water being removed by the weir 23. As the electrodes 47 and 56 will be moving apart, adjustment of the impressed potential may take place to maintain the desired rate of dewatering.

With the D.C. potential being continuously applied between the electrodes 47 and 56 for a period in the order of 17–26 hours and the plant slimes continuously flooding the pond 10 at a rate in the order of 30,000 gpm, the continuous decanting of freed water will result in the termination of the "on fill" stage of plant slimes discharge into the pond 10. At this point the level 51 will be in the order of six feet, well under the twenty foot height of the dikes 43.

Under a third option, the use of electric current to improve the dewatering rate would be confined to "off-peak" periods to take advantage of lower electrical rates. If this option is selected, the level 51 at the end of 17–26 hours of "on fill" stage would be in the order of 10–15 feet depending upon the length of the "off peak" period.

Many other options of operation are available to balance the dewatering of plant slimes with the plant production of such slimes.

"On Dewatering" Stage

Following the "on fill" stage, pond 10 is at the "on dewatering" stage. If the average solids content of the dewatered slimes in pond 10 is below that required to form a stable landfill with sand tailings, further dewatering will take place by natural dewatering or by electrokinetics or a combination thereof.

The "on dewatering" stage in pond 10 will be terminated as soon as the desired density is obtained and may be omitted completely under certain operating conditions. Preferably the next step is to flush the pipes 21 with plant slimes for a short period using the booster pump 48. If desired, this step may be carried out in combination with the use of compressed air sectionally blown through the pipes 210. This combined action of back flushing the pipes 21 and use of compressed air will improve the uniformity of density of the slimes as well as the pumpability.

The final step performed in pond 10 is the "on removal" stage during which the thickened slimes will be pumped from the pond 10 to the mixing station 35 and the mixture of slimes and tailings discharged into the mining cut 32.

"On Removal" Stage

The "on removal" stage in pond 10 begins with the use of the pipes 21 to remove the thickened slimes by the pump 38. As the level 51 in pond 10 is lowered by pump 38, the buoyant supports 50 will follow the level 51 until the electrodes 56 come to rest on the pipes 21.

It has been observed in tests that the flat undersurface and floating weight of the slabs 55 acts to reduce the tendency of the slimes to "cone" adjacent the perforations 21' under the suction of the pump 38. With the supports 50 resting on the pipes 21 the pumping operation is terminated and pond 10 is now in condition to be inspected and returned to the "on fill" stage.

In practice, the level 51 is lowered to a point floating the supports 50 slightly above the pipes 21. This enables the rows or supports 50 extending across the narrow width of the pond 10 to be readily shifted horizontally relative to each other. Thus an inspector may walk between rows of floating supports 50 on the electrode 47 supported by the bottom 20. During major component replacement, the floating individual rows of supports 50 may be retrieved from the dikes 43.

Adjustable Weirs

It will be appreciated that the level 51 will be affected by the plant slimes 52 flowing into the pond 10 through pipes 21, by the decanting of the freed water and by the thickened slimes removal to the mixing station 35. During all of the stages taking place in pond 10, there will be substantial freed water above the interface 53 except for a short period at the start of the "on removal" stage.

As only clear water is intended to flow over the weir 23, the height of the weir 23 must be continuously adjusted relative to the interface 53. A suitable sonic, laser reflective sensor or the like may be used to control the mechanism regulating the height of the weir 23. Preferably the operation of the weir 23 will be programmed to decant clear water from above the interface 53 at all times except just prior and during the period the thickened slimes are being "blown" by compressed air in preparation for removal.

Sequencing of Ponds

While the three ponds 10, 11 and 12 illustrate the settling area devoted to dewatering of plant slimes in my closed loop system, the maximum dewatering rate of the system will permit the use of only two of the three ponds. This will enable any one of the three or more ponds of the settling area to be out of service for repairs, replacement of components and the like.

Depending upon the sizing of the settling area, and the capacity of the means for improving the rate of natural dewatering, the sequence of operations will require that the "on fill" stage of the pond 11, for example, directly follows the termination of the "on fill" stage of pond 10.

As pond 11 goes through its filling and dewatering stages, pumping will have been completed in pond 10 in advance of the termination of the "on fill" stage in pond 11 thus enabling the discharge of plant slimes to be switched back to pond 10.

Obviously, the use of only two of the three ponds 10, 11 and 12 in the sequence of operation of the closed loop system, will increase the amount of electrical energy used in the form of direct current. It will also require that the dewatering of the slimes takes place during the "on fill" stage to permit the use of pipes 21 for both input and output movement of the slimes unless the pumping time of the thickened slimes is less than the "on fill" time. In that event, additional dewatering may be sandwiched between the termination of the "on fill" stage and the start of the pumping operation.

Natural Dewatering

It is anticipated that in actual commercial practice of the present invention, the settling area may embrace four ponds, in lieu of three, in order to avoid the necessity of improving the natural dewatering rate during the "on fill" stage by electrokinetics.

With four ponds and the elimination of electrokinetics, it is anticipated that the presettling treatment station 22 will come into play for the addition of reagents capable of improving the rate of natural dewatering.

As indicated herein, continuous top decanting of the freed water has provided an observed improvement in the natural dewatering rate in the order of 10%.

Vertical Electrodes

Figure 6:
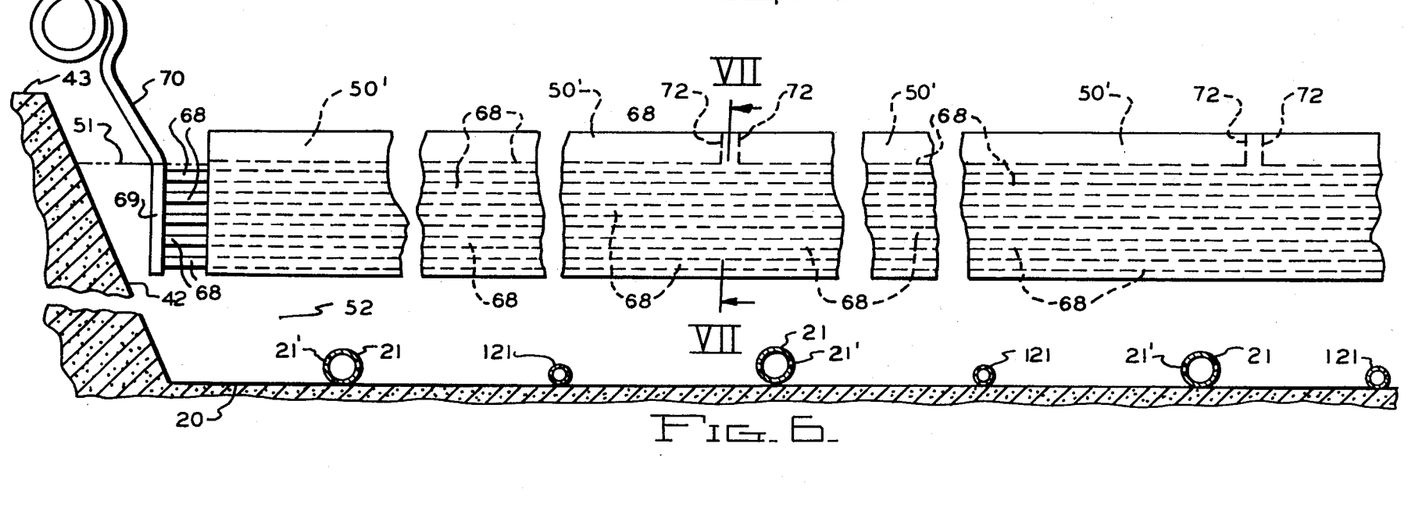
FIG. 6 is a view similar to FIG. 5 of a modified form of electrode support showing horizontally spaced vertical electrodes.

A modification of the electrode arrangement of FIG. 5 is shown in FIGS. 6 and 7 in which spaced vertical electrodes are used in lieu of horizontal electrodes in the application of electrokinetics to my closed loop system. It has for one of its advantages, the elimination of the laminated association of the plastic film or sheeting, and the electrode 47. Comparative tests indicate that this modification may not provide as much improvement in the dewatering rate as the horizontal electrodes of the form of FIG. 5 for the same expenditure of electrical energy. Contributing to this difference in performance is believed to be the fact that in the form of FIG. 5, gravity reinforces separation and the spacing of the electrodes is reduced when the level 51 is lowered, whereas in the form of FIGS. 6 and 7, the spacing of the electrodes remains the same throughout the application of direct current to the slimes.

As shown in FIGS. 6 and 7, the buoyant electrode supports 50' may be fabricated from 4'×8' slabs of 4" foam. Heavy duty plastic film strips 64, in the order of 6 to 10 mils of a continuous length, approximating the narrow width of a settling pond, is bonded to the opposite longitudinal vertical sides 65 of the supports 50' with their upper edges 66 bent over and extending along at least a portion of the top surface 67 of the supports 50' and bonded to the surface 67.

The film strips 64 have portions depending below the sides 65 to which are bonded continuous lengths of electrode members 68 in vertical spaced relations. Electrode members 68 are coextensive with the strips 64 and terminate adjacent opposite sides of the settling pond in conductive terminals 69. Flexible conductors 70 extend between the terminals 69 and a suitable source of direct current. An extension coil 71 is provided by each conductor 70 to accommodate the range of vertical movement of the supports 50' on the surface 51 of the slimes 52.

Film strips 64 act to reinforce and protect the sides 65 of the supports 50'. They also act to slightly separate the adjacent ends 72 of the supports 50', as well as to connect the supports 50' of the same row extending across the narrow width of the pond. In addition, the depending portions 64' of the strips 64 provide the support for the electrode members 68 in spaced parallel relation; the electrode members 68 collectively defining, on opposite sides of the supports 50', the positive and negative electrodes 73 and 74.

Spaced by the vertical sides 65 of the supports 50', the weight of the electrode members 68 tends to vertically position the electrodes 73 and 74. By being bonded on the inside of the depending portions 64', the members 68 collectively defining the electrodes 73 and 74 are insulated from the depending electrodes of adjacent rows of supports 50'. Also, as indicated in FIG. 7 by plus and minus signs, the depending electrodes most adjacent the electrodes of adjacent rows of supports 50' may be of the same polarity.

The electrode members 68 may be of milled edge flat aluminum stock. Preferably, the members 68, in addition to being spaced, are connected only by the flexible film to which they are bonded. This allows the electrodes 73 and 74 to collapse in a vertical direction into an orderly pile during pumping when the electrodes 73 and 74 come to rest upon the pipes 21. Thus the advantage of the form of FIG. 5 is retained in regard to the action of the flat underside of supports 50' to reduce "coning" of the thickened slime during removal.

To install the supports 50' on the surface of the pond, it is anticipated that the rows of supports 50' will be most conveniently assembled on the edge of the pond and floated into position as a long continuous component of a length approximating that of the pond bottom 20.

Aspects of Vertical Electrodes

Aside from their support of the members 68, defining the electrodes 73 and 74, the depending portions 64' have several other functions: (a) they provide surface channels for the freed water extending across the pond which are relatively undisturbed by wind or wave action; (b) they constitute vertical baffles depending from the level 51 to reduce turbidity between the clear water and the interface 53; (c) they channel the flow of the freed water adjacent the dikes 43 on its movement toward and across the weir to effectively skim the supernatant above the interface 53; and (d) they reduce the effect of air movement over the pond to modify the level of the pond surface.

Buoyant Decanting

In the use of testing equipment in the reduction to experimental practice of the present invention, it was found convenient to syphon the supernatant. This was done by supporting the intake of the syphon from the buoyant electrode support. As the level 51 moved up and down by intake of slimes or decanting of freed water, the syphon intake would retain its same relation to the level 51.

FIG. 7 shows each row of supports 50' equipped with a perforated plastic syphon pipe 75 substantially coextensive with the electrodes 73 and 74. The pipe 75 is bonded along one side to one of the strips 64 of each support 50'.

Pipes 75 of adjacent rows of supports 50' may be flexibly connected at opposite ends to manifold pipes located along the sides of the pond and connected to a suitable suction pump for delivery of the freed water to the plant.

As shown in FIG. 7, the pipes between adjacent rows of supports 50' act as bumpers between the rows protecting the supports 50' from abrasion. If desired, the manifold suction pipes on opposite sides of the pond and extending parallel to the longitudinal axis of the pond, to which the pipes 75 connect, may also be perforated and floated to function in the same manner as the pipes 75. With such an arrangement, some or all of the freed water flowing in the channels defined between the strips 64, will be removed by the manifold pipes to reduce or eliminate the need for the weir 23.

Pilot Plant

Figure 8:
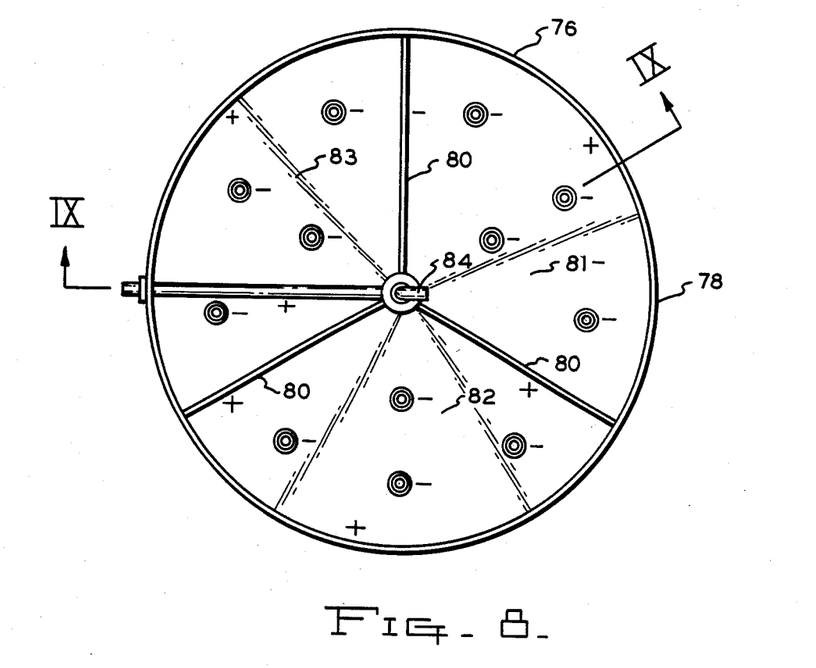
FIG. 8 is a plan view of another form of settling area.
Figure 9:
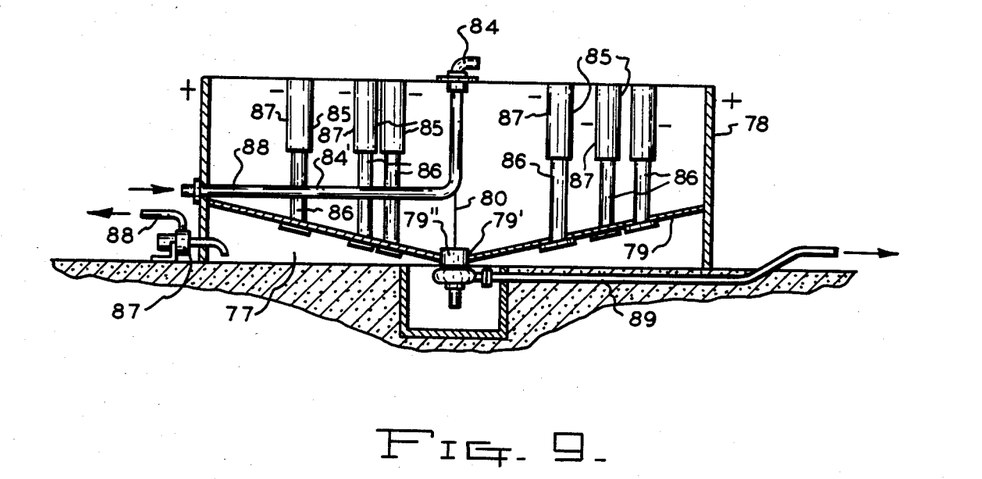
FIG. 9 is a vertical section taken on line IX—IX of FIG. 8.

Anticipating that a pilot plant operation may be required to demonstrate the commercial use of the present invention, in FIGS. 8 and 9 is shown a tank 76 having a diameter of 64' and a height of 7' of which 2' is the height of the outer wall of the filter bed 77 at the vertical wall 78. A conical wall 79 defines the upper wall of the bed 77 and the bottom of the tank 76 and extends from the wall 78 to a centrally located opening 79' in which a selector valve and pump intake assembly 79" is located.

Vertical radial walls 80 divide the tank 76 into three separate settling areas or sections 81, 82 and 83, corresponding in purpose to the ponds 10, 11 and 12 of FIGS. 1 and 2. Fresh slimes from the plant are selectively discharged into the three sections through a selectively rotated discharge 84 to fill the sections 81, 82 and 83 in sequence.

To decant the freed water as it is formed on the surface of the plant slimes discharged into the tank 76, tubular weirs 85 are adjustable to withdraw through the lower pipe sections 86 only the freed supernatant. Sections 86 open through and they are vertically supported from the bottom 79 and electrically insulated therefrom. The supernatant flows downwardly in the section 86 into the filter bed 77 from which the clear water is removed by the pump 87 and returned to the plant by the pipe 88.

Means for providing the weirs 85 with vertically adjustable decanting positions may take many forms. For example, the upper section 87 may be in the form of a split sleeve, which, when rotated, will progressively expose vertically arranged openings in the section 86; the openings being disposed in a spiral path.

To provide the dewatering areas of the tank 76 with electrokinetic capability, the inner surface of the wall 78 is insulated from the bottom 79 as well as from the pipe 84' extending to the nozzle 84. Likewise, the vertical radial walls 80 are insulated from the conical bottom 79 and pipe 84'. With the walls 78 and 80 acting as a positive electrode and the weirs 85 including the sections 86 acting as a negative electrode, direct current may flow between these vertical electrodes through the plant slimes sequentially discharged into the tank sections 81, 82 and 83.

Pilot Plant Sequence

A sequence of operation of the pilot plant structure of FIGS. 8 and 9 may be as follows: fresh plant slimes are directed into section 81 with the nozzle 84 in the position shown. Suitable sonic sensors will have adjusted the weir 85 in section 81 to shut off all drainage into the filter bed 77. With the section 81 filled to a selected level, the nozzle 84 is rotated to initiate the filling of section 82. At the same time the weir 85 in section 81 has been adjusted to decant the supernatant above the interface into the bed 77 to be returned to the processing plant and/or the slurry pit by the pump 87. At the same time, if desired, direct current is flowing between the walls 78 and 80, and the weirs 85 associated with the section 81.

By the time section 82 has been filled, dewatering in section 81 has thickened the slimes in section to the desired solids content. At the same time, section 83 is placed "on fill" stage, the "on removal" stage is initiated in section 81. To that end, the sectional valve of assembly 79" is opened into the interior of section 81 and the thickened slimes of section 81 are pumped out through the pipe 89. Slope of the conical bottom 79, vibration of the bottom 79, as well as the application of compressed air and slushing, will aid in the removal of the dewatered slimes.

When the "on fill" stage in section 83 has been completed, the "on removal" stage in section 81 has been completed a short time prior thereto. Preferably, the initial flow of plant slimes into the section 81 to repeat the sequence of operation is used to flush the thickened slimes still remaining in section 81 down the slope of the bottom 79 toward the opening 79', regulated by the assembly 79"'.

As in the case of the other forms of the invention, dewatering and decanting preferably takes place during the "on dewatering" and "on removal" stages. By separately flooding the bottom 79 of each section 81, 82 and 83 in lieu of the single nozzle 84, decanting of the supernatant may take place during the "on fill" stage. If the sections are to be separately flooded, the discharge of the plant slimes will be through the wall 78 adjacent the upper edge of the conical bottom 79 to flush the slimes remaining from the "on removal" stage toward the opening 79'.

To balance the dewatering phase of each section 81, 82 and 83 with the amount of plant slimes being directed into the pilot plant for dewatering, the duration and voltage of the electrokinetics being applied may be adjusted.

Electrode Replacement

The use of electrokinetics to improve the rate of dewatering will require replacement of the electrodes from time to time. When one or both electrodes is buoyantly supported on the surface of the slimes being dewatered, it is anticipated that the buoyant support structure will not be replaced as frequently as the electrodes. For this reason the electrodes should be removably attached to the buoyant support structure.

With reference to the form of FIGS. 6 and 7, the replacement of the electrodes 73 and 74 would involve severing the depending portions of the strips 64 from the portions bonded to the supports 50'. The replacement electrodes would then be removably attached to the supports 50' in substantially the same location as the original depending portions.

Should it be found feasible to enlarge the pilot plant of FIGS. 8 and 9, and place the same in commercial use, surfaces which function as electrodes as disclosed in reference to the pilot plant, will be replaced with suitable removable laminate.

Flooding Impoundments

In lieu of using the pipes 21 to both flood the ponds with slimes and to remove the dewatered slimes, the pipes 21 may be used only to remove the dewatered slimes. In this event the fresh plant slimes may be discharged at one or more points along both longitudinal sides of the ponds with the buoyant electrode supports 50' acting to smooth out the turbulence of the discharge into the pond. The descending electrodes of the form of FIGS. 6 and 7 will materially assist such action.

To enable early dewatering and decanting of the slimes, the discharge of plant slimes into the pond is preferably adjacent the bottom 20 to avoid turbidity between the level 51 and the interface 53.

Summary

From the description of the operation of the embodiments described above it will be appreciated that an effective system for dewatering slimes is achieved by the invention. The improvements resulting from the invention result from the described relationship of the components which permit a number of operational features to occur which have proven to augment the process. For instance, it is highly desirable that the upper electrodes be of a negative potential, while the positive polarity occurs at the lower regions of the treatment volume. The flow of water is toward the negative electrode and the resulting hydrogen that is produced by electrolysis occurs in the relatively clear water adjacent the negative electrodes. Thus, the creation of hydrogen, and the associated bubbles, do not produce agitation at the lower regions. The effect of the positive potential at the bottom of the treatment volume permits gravity to assist in the dewatering process as natural precipation of the solids occurs.

With the apparatus of the invention it is possible to intermittently apply the voltage to the electrodes to achieve a "coasting" effect. For instance, the voltage may be applied to the electrodes for ten minutes, and then terminated for fifty minutes. Such operation reduces the electricity requirements and yet permits an effective process of dewatering to occur.

It is also to be appreciated that the described dewatering system only requires low voltages and the voltage requirements are inversely proportional to the treatment time necessary. Thus, it is possible to generate the electricity required by the process by solar means, and as the need for the process is primarily in southern states such as Florida which enjoy high percentages of direct sunlight during most days, solar electric generation to provide energy for the process is feasible.

It is appreciated that various modifications to the basic inventive concepts may be apparent to those skilled in the art without departing from the scope of the invention, and the invention is to be defined only by the language of the following claims.

I claim:

1. In a closed loop system of dewatering fresh plant slimes produced during the processing of phosphate rock and the like to a solids content forming a stable landfill when mixed with sand tailings from the plant and the like wherein the processing plant receives phosphate rock from a mining cut, a method of balancing the rate of dewatering such slimes with the slimes producing capacity of the plant comprising the following steps:
   (a) directing the fresh slimes from the plant sequentially into two or more impoundments wherein natural dewatering of the slimes takes place,
   (b) improving the rate of dewatering in said impoundments by electrokinetics to effect said balancing,
   (c) removing the supernatant formed by dewatering,
   (d) sequentially removing the dewatered slimes from said impoundments when a predetermined solids content has been obtained and mixing the removed dewatered slimes with sand tailings from the plant to form a mixture, and
   (e) introducing said mixture into a mining cut to form a stable landfill.

2. In a closed loop system as defined in claim 1, the step of decanting the supernatant at the rate formed.

3. In a closed loop system as defined in claim 1, the impoundments being sized to permit intermittent application of electrokinetics.

4. In a closed loop system as defined in claim 1, the application of electrokinetics being intermittent to balance the dewatering with plant capacity and the sizing of the impoundments being less than required solely by natural dewatering.

5. In a closed loop system as defined in claim 1, wherein the impoundments are sequentially flooded by the plant slimes through a network of discharge pipes supported on the bottom of the impoundments.

6. In a closed loop system as defined in claim 5, wherein said discharge pipes also function as the means for uniformly removing the dewatered slimes.

7. In a closed loop system as defined by claim 1, wherein the impoundment area is flooded with plant slimes at a plurality of points spaced substantially throughout the entire impoundment.

8. In a closed loop system as defined in claim 1 wherein the impoundment is flooded with plant slimes discharge into the impoundment along one or more sides and buoyant baffle means are provided on the impoundment surface to reduce turbulence.

9. In a closed loop system as defined in claim 1 wherein the means for applying electrokinetics to the slimes includes means to baffle and direct the movement of slimes and freed waters.

10. In a closed loop system as defined in claim 1, including said step of introducing the removed supernatant into the slurry pit.

11. In a closed loop system as defined in claim 1 wherein the processing plant receives a phosphate slurry from a slurry pit receiving phosphate rock from a mining cut.

* * * * *